Sept. 28, 1965   G. GRANDI ET AL   3,208,128
SHAVING TOOL
Filed April 29, 1964   2 Sheets-Sheet 1
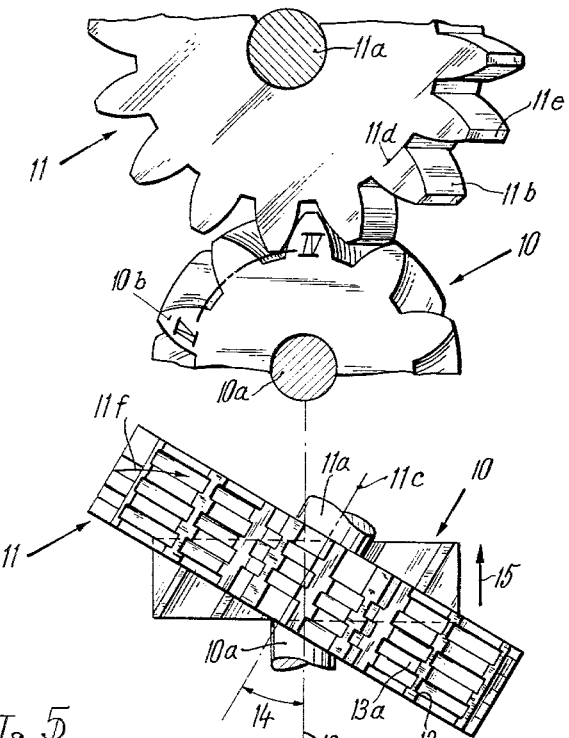
INVENTOR.
GIANFRANCO GRANDI
ALOIS GRECK
BY HANS STERK
  Michael J Striker
      ATTORNEY Sept. 28, 1965     G. GRANDI ETAL     3,208,128
SHAVING TOOL
Filed April 29, 1964                2 Sheets-Sheet 2
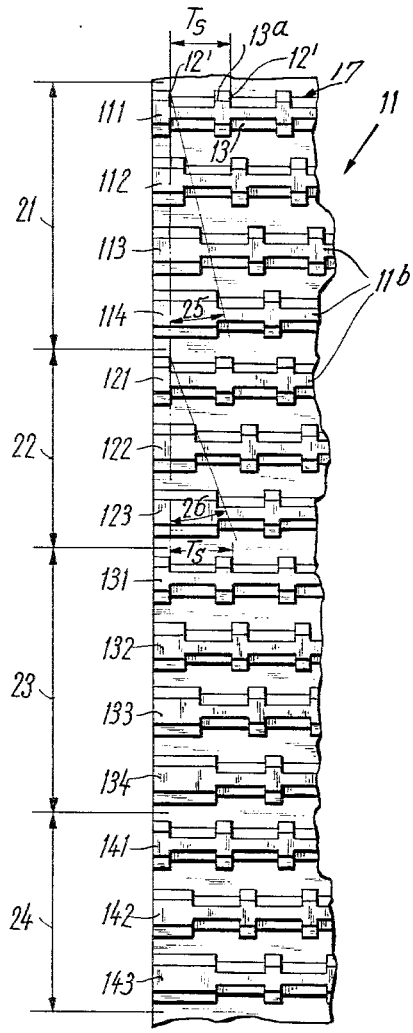
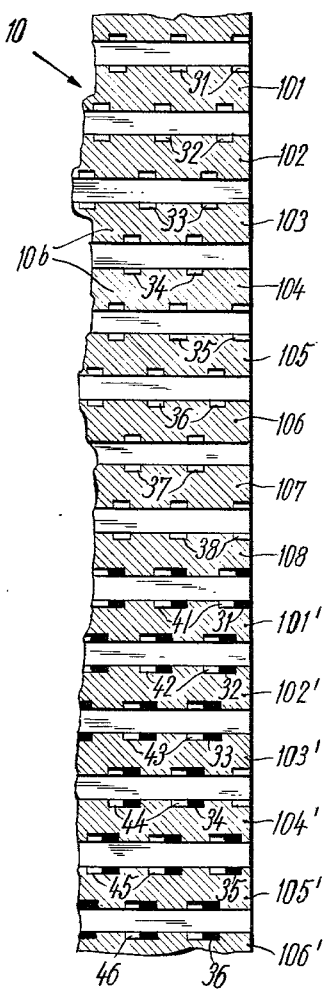
INVENTOR.
GIANFRANCO GRANDI
ALOIS GRECK
BY HANS STERK
Michael J. Striker
ATTORNEY United States Patent Office 3,208,128
Patented Sept. 28, 1965

3,208,128
SHAVING TOOL
Gianfranco Grandi and Alois Greck, Munich, and Hans Sterk, Hohenbrunn, near Munich, Germany, assignors to Carl Hurth Maschinen- und Zahnradfabrik, Munich, Germany
Filed Apr. 29, 1964, Ser. No. 363,367
Claims priority, application Germany, Apr. 30, 1963, H 49,026
12 Claims. (Cl. 29—103)

The present invention relates to apparatus for treating gears and similar toothed workpieces, and more particularly to an improved rotary gear-shaped shaving tool which is utilized to remove shavings from the flanks on the teeth of gears or the like.

It is an important object of our invention to provide a shaving tool which may be used for shaving, burnishing or grinding of toothed workpieces having a predetermined number of teeth, whose shaving action is highly satisfactory and is characterized by the absence of zebra stripes or similar marks which are normally observable on tooth flanks following an unsatisfactory shaving, burnishing or grinding operation.

Another object of the invention is to provide a shaving tool of the above outlined characteristics which is particularly suited for treatment of gears and similar toothed workpieces by the crossed-axes method.

A further object of the invention is to provide a novel distribution of cutting edges on the tooth flanks of a rotary gear-shaped shaving tool.

A concomitant object of our instant invention is to provide a rotary shaving tool which can properly treat a toothed workpiece in the absence of axial movement between the two intermeshing parts and which can complete a shaving, burnishing or grinding operation within a very short period of time, i.e., in response to a small number of revolutions of the workpiece while the teeth of the workpiece mesh with the teeth of the tool.

With the above objects in view, one feature of our invention resides in the provision of a rotary gear-shaped shaving tool for treatment of gears and similar toothed workpieces by the crossed-axes method. The shaving tool comprises a plurality of equidistant teeth forming at least two groups and having flanks provided with cutting edges which extend from the roots to the lands of the respective teeth. The cutting edges on the teeth of each group form a plurality of helices and the lead of helices formed by the cutting edges on the teeth of one such group is different from the lead of helices formed by the cutting edges on the teeth of at least one other group. Preferably, the two groups will contain different numbers of teeth.

If the teeth form more than two groups, the number of groups will be an even number and the arrangement will be such that groups having teeth with cutting edges forming helices having a first lead alternate with groups whose teeth are provided with cutting edges having helices with a second lead different from the first lead.

As a rule, the number of teeth in at least one group will be selected in such a way that, with the exception of the number one, it has no common divisor with that number which equals the number of teeth on the workpiece.

The novel features which are considered as characteristic of the invention are set forth in particular in the appended claims. The improved shaving tool itself, however, both as to its construction and the method of using the same, together with additional features and advantages thereof, will be best understood upon perusal of the following detailed description of certain specific embodiments with reference to the accompanying drawings, in which:

FIG. 1 is a fragmentary front elevational view of a gear shaving machine which utilizes a shaving tool embodying one form of the present invention;

FIG. 2 is a top plan view of the structure shown in FIG. 1;

FIG. 3 is a fragmentary developed view of the shaving tool with one flank of each tooth omitted;

FIG. 4 is a fragmentary developed view of a workpiece which may be treated by the shaving tool of FIG. 3; and FIG. 5 is a table illustrating the sequence in which the tooth flanks of the workpiece are treated by the cutting edges of the shaving tool.

FIGS. 1 and 2 illustrate a portion of a machine which is used for shaving of gears 10 and similar toothed workpieces. The illustrated structure includes a work holder having a spindle 10a for the workpiece 10 and a tool holder having a spindle 11a for a rotary gear-shaped shaving tool 11 which is machined and configurated in accordance with the present invention. The teeth 10b of the workpiece 10 mesh with the teeth 11b of the shaving tool 11, and the axis 11c of the spindle 11a crosses in space the axis 10c of the spindle 10a. The numeral 12 indicates straight cutting edges on the flanks of teeth 11b, and such cutting edges are separated from each other by grooves 13 which extend from the roots 11d to the lands 11e of the respective teeth 11b. In the illustrated embodiment, each cutting edge 12 is located in a plane which is perpendicular to the axis 11c. The angle 14 between the projections of the axes 10c, 11c into the plane of FIG. 2 is an acute angle and, due to such crossed-axes mounting of the spindles 10a, 11a, the cutting edges 12 will travel axially of the workpiece 10 (see the arrow 15) to remove shavings from the flanks of the teeth 10b. Since the extent of such axial travel is not always sufficient to insure satisfactory removal of shavings, the cutting edges 12 are arranged to form a series of helices so that there is no need for positive axial movement of the tool 11 or workpiece 10 when the teeth 10b, 11b mesh in the course of a shaving, burnishing or grinding operation.

The configuration of teeth on the shaving tool 11 will be best understood with reference to FIG. 3 which is a fragmentary developed view of the tool with one flank 17 on each of the teeth 11b omitted. The tool 11 comprises a total of fourteen teeth 11b which are arranged in four consecutive groups 21, 22, 23, 24. The first group 21 comprises four teeth numbered 111, 112, 113, 114, and the next group 22 comprises three teeth numbered 121, 122, 123. The groups 23, 24 respectively comprise four teeth numbered 131, 132, 133, 134 and three teeth numbered 141, 142, 143. Thus, the number of teeth in each group (21, 23 and 22, 24) is the same, and each group (21 or 23) having a given number of (four) teeth is followed by a group (22 or 24) having a different number of (three) teeth.

The cutting edges 12' on the flank 17 of the first tooth 111 of the first group 21 will remove shavings when the tool 11 rotates in a direction indicated by the arrow 11f (see FIG. 2). These cutting edges 12' are separated from each other by a groove 13 and by a rib 13a, and it is clear that the tooth 111 normally comprises a large number of such "complementary" cutting edges. The axial distance $T_s$ between the complementary cutting edges on each tooth of the tool 11 is the same. However, since the groups 21–24 comprise different numbers of teeth, since the cutting edges on the first tooth of each group are coplanar, and since the cutting edges on consecutive teeth of each group are staggered axially through equal distances with reference to each other, the lead of the helices formed by such complementary cutting edges on the teeth of two adjacent groups is not the same. Thus, the lead of helices defined by the cutting edges of teeth in the group 21 (see the angle 25) is different from the lead of helices (angle 26) defined by the cutting edges of teeth in the second group 22. The lead in groups 21, 23 and 22, 24 is the same.

FIG. 4 illustrates the workpiece 10 in two developed views with one flank of each tooth 10b omitted for the sake of clarity. For better understanding of the invention, the workpiece has been shown with a small number of (eight) teeth 10b including the teeth numbered 101, 102, 103, 104, 105, 106, 107 and 108. These teeth are shown in alignment with consecutive teeth 111–114, 121–123 and 31 of the shaving tool 11. During the first revolution of the workpiece 10, the teeth 101–108 will mesh with the teeth 111–114, 121–123 and 131. During the second revolution of the workpiece, the teeth 101–108 (shown at 101'–108' in the lower part of FIG. 4) will respectively mesh with the teeth 132–134, 141–143 and 111–112 of the tool 11.

When the tool and the workpiece are brought into mesh so that the flank 17 on the tooth 111 engages one flank of the tooth 101, the cutting edges 12' will remove shavings to form grooves 31, see FIG. 4. These grooves are grossly exaggerated for the sake of clarity. As the tool 11 continues to rotate, its tooth 112 meshes with the tooth 102 and the cutting edges of the tooth 112 remove shavings to form grooves 32 (only one shown). The teeth 113, 114, 121, 122, 123, 131 then treat the teeth 103, 104, 105, 106, 107, 108 to remove shavings and to respectively form grooves 33, 34, 35, 36, 37 and 38 shown in FIG. 4. The cutting edges of the tooth 131 remove from the tooth 108 shaving to form the aforementioned grooves 38 which correspond (in position) to the grooves 31 in the flank of the tooth 101. During the second revolution of the workpiece 10, the teeth 132, 133, 134, 141, 142, 143 treat the teeth numbered 101'–106' to form grooves 41, 42, 43, 44, 45, 46. These grooves are respectively adjacent to grooves 31–36 which are indicated by black rectangles. The tooth 107' is then shaved by cutting edges 12' of the tooth 111 which forms grooves 47, and the cutting edges of the tooth 112 will treat the tooth 108' to form grooves 48.

The table of FIG. 5 illustrates the sequence in which the flanks of the teeth 101–108 on the workpiece 10 are treated by the cutting edges on the teeth 111–114, 121–123, 131–134 and 141–143 during a series of consecutive revolutions of the workpiece. The first horizontal row of the table contains the numerals 101–108 representing the teeth of the workpiece. The second horizontal row indicates that the teeth of the workpiece are treated by the teeth 111–114, 121–123 and 131 in the same order. The third horizontal row indicates that, when the workpiece 10 performs the next (second) revolution, its teeth 101–108 are respectively treated by the teeth 132–134, 141–143 and 111–112. It will be noted that, during its eighth revolution, the teeth 101-108 of the workpiece are treated by the same teeth (111–114, 121–123 and 131) as during the first revolution. This will be readily understood since the number 56 is the lowest number which divisible by eight and fourteen. The heavy lines 150, 151, 152, 153 indicate such stages of the shaving operation when the tool 11 respectively completes a first, second, third and fourth revolution.

Upon completion of seven revolutions, the flanks of the workpiece 10 have undergone a complete shaving operation because each of the teeth 101–108 has been shaved by the cutting edges on all of the teeth belonging to two different groups. Thus, the flank of the tooth 101 has been shaved by the cutting edges of teeth 111, 113, 132, 134 and 121, 123, 142 which together correspond to the teeth in groups 21, 22 or 23, 24 or 21, 24 or 22, 23. The flank of the tooth 102 has been treated by the cutting edges of teeth 112, 114, 131, 133 and 122, 141, 143 which together again correspond to cutting edges on two different groups, etc.

Were the shaving tool 11 provided with fourteen teeth but without a grouping as set forth in connection with FIG. 3 (i.e., if the cutting edges on all fourteen teeth would form a series of helices with the same lead), the operation would be completed upon seven revolutions of the workpiece 10 but the shaving action would be inferior because the flank of the tooth 102 would be treated exclusively by evenly numbered teeth of the tool. This can be determined with reference to the table of FIG. 5 wherein the teeth 112, 133, 114, 141, 122, 143, 131 are respectively the second, tenth, fourth, twelfth, sixth, fourteenth and eighth in the sequence as shown in FIG. 3.

A very important advantage of the improved shaving tool with four, six or more groups of teeth wherein groups having for example three teeth alternate with groups having for example four teeth is that such groups may add up to any desired number which corresponds to the optimum number of teeth on the shaving tool. Thus, the shaving tool may be produced with any cutter which is available and, furthermore, the shaving action is superior to the shaving action of conventional tools of which we are aware at this time. This can be explained as follows: A certain portion of a given tooth flank on the workpiece is treated by cutting edges on the teeth of one group and also by cutting edges on the teeth of at least one other group. Since the lead of helices formed by the cutting edges on different groups of teeth is different, the zones from which shavings are removed are staggered with reference to each other to avoid the formation of pronounced zebra stripes and similar marks.

The following example is being given for the purpose of better understanding of our invention without any intent that this example be construed in a limitative sense.

In a copending application Serial No. 158,407, now Patent No. 3,169,447 of Fritz Hurth which is assigned to the same assignee and to which reference may be had if necessary, there is disclosed a gear finishing tool which will produce a satisfactory shaving action if the number of its teeth is properly correlated to the number of teeth on the workpiece which is to be treated thereby. However, such requirement cannot always be fulfilled for the following reasons: It is to be assumed that the workpiece to be treated has twelve teeth. In accordance with the disclosure in the aforementioned copending application, such a workpiece will be shaved satisfactorily by using a shaving tool comprising several groups of teeth with each group comprising eleven or thirteen teeth. If the shaving tool is to undergo little wear, it should be as large as possible. However, the dimensions of the shaving tool are limited by reason of cost and also because even a large gear shaving machine cannot accommodate a shaving tool whose diameter exceeds a given magnitude. A satisfactory shaving tool for a workpiece with twelve teeth will have about 130–140 teeth. Now, and by following the disclosure of the aforementioned copending application, the number of teeth in each group of teeth on the shaving tool should be as close as possible to but should not be the same as the number of teeth on the workpiece. In the present instance, this would mean that a workpiece having twelve teeth can be treated quite satisfactorily with a tool having one hundred thirty-two teeth (twelve groups each and 11 teeth) or one hundred forty-three teeth (eleven groups with 13 teeth each). If the grinding machine which is utilized for the manufacture of such shaving tools merely comprises a cutter which can treat a shaving tool with say one hundred thirty-six teeth, there is no way of producing a shaving tool which could be utilized in practicing the invention of the aforementioned application.

In accordance with the present invention, the workpiece with twelve teeth can be treated very satisfactorily with a shaving tool having one hundred thirty-six teeth by arranging the teeth of the shaving tool in twelve groups whereby ten groups comprise eleven teeth each and the remaining two groups comprise thirteen teeth each. Such shaving tool can be produced in a grinding machine having a cutter arranged to produce a tool with one hundred thirty-six teeth. It will be noted that such a shaving tool will still meet the important requirement of the invention disclosed in the aforementioned application Serial No. 158,407 according to which the number of teeth in each group should not be the same as the number of teeth on the workpiece but should be close thereto (preferably exceeding by one or being less by one than the number of teeth on the workpiece).

Another example of a satisfactory shaving tool is one having four groups of eleven teeth each, and four groups of twelve teeth each for shaving of a workpiece having twenty-four teeth. It will be noted that the number one is the common divisor for the numbers eleven and twenty-four.

The lead of each helix formed by cutting edges in any given group of teeth on the shaving tool is a whole multiple (including one) of the axial distance $T_s$ between a pair of corresponding cutting edges on any given tooth flank of the shaving tool. Thus, the lead of the helices formed by the cutting edges shown in FIG. 3 may be $T_s$, $2T_s$, $3T_s$, etc. Such distribution of cutting edges insures regular removal of shavings.

Finally, we wish to mention that it suffices if at least one group comprises a number of teeth which (save for the number one) has no common divisor with the number of teeth on the workpiece. In the case of the shaving tool 11, the number of teeth in the group 21 or 23 is divisible by two and four, and the number of teeth on the workpiece 10 is also divisible by two and four. However, the number of teeth in the group 22 or 24 is a prime number which has no common divisor (save for one) with the number of teeth on the workpiece 10.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A rotary tool for treatment of toothed workpieces by the crossed-axes method, comprising teeth forming at least two groups and having flanks provided with cutting edges which extend in directions from the roots to the lands thereof, the cutting edges on the teeth of each group forming a plurality of helices and the lead of helices formed by the cutting edges on teeth in one of said groups being different from the lead of helices formed by the cutting edges on the teeth of the other group.

2. As a novel article of manufacture, a rotary gear-shaped tool for treatment of toothed workpieces by the crossed-axes method, said tool comprising a plurality of teeth forming at least two groups each having a different number of teeth, said teeth having flanks provided with cutting edges extending from the roots to the lands thereof and the cutting edges on the teeth of each group forming a plurality of helices, the lead of helices formed by the cutting edges on teeth in one of said groups being different from the lead of helices formed by the cutting edges on the teeth of the other group.

3. As a novel article of manufacture, a rotary gear-shaped tool for treatment of toothed workpieces by the crossed-axes method, said tool comprising a plurality of equidistant teeth having flanks provided with cutting edges extending from the roots to the lands thereof, said teeth forming three groups of teeth and the cutting edges on the teeth of each group forming a plurality of helices, the lead of helices on the teeth of two of said groups being the same but different from the lead of helices on the teeth of the third group, said third group of teeth being disposed between the other two groups.

4. As a novel article of manufacture, a rotary tool for treatment of toothed workpieces by the crossed-axes method, said tool comprising a plurality of teeth having flanks provided with cutting edges extending from the roots to the lands thereof, said teeth forming an even number of consecutive groups which exceeds three and the cutting edges on each group of teeth forming a plurality of helices, the lead of helices formed by the cutting edges on the teeth of each consecutive group being different from the lead of helices formed by the cutting edges on the teeth of preceding group.

5. A rotary tool for treatment of toothed workpieces having a predetermined number of teeth by the crossed-axes method, said tool comprising a plurality of teeth forming a plurality of groups and having flanks provided with cutting edges extending from the roots to the lands thereof, the cutting edges on the teeth of each group forming a plurality of helices and the lead of helices formed by the cutting edges on at least one group of said teeth being different from the lead of helices on at least one other group of teeth, the number of teeth in at least one of said groups being different from said predetermined number.

6. A tool as set forth in claim 5, wherein the number of teeth in each of said groups is different from said predetermined number.

7. A tool as set forth in claim 5, wherein the number of teeth in at least one of said groups differentiates from said predetermined number in such a way that number one is the sole common divisor therefor.

8. As a novel article of manufacture, a rotary gear-shaped tool for removing shavings from the flanks of toothed workpieces by a crossed-axes method, comprising a plurality of teeth having flanks provided with cutting edges extending from the roots to the lands thereof, said teeth forming a plurality of groups and the cutting edges on each group of teeth forming a plurality of helices, the lead of helices on the teeth of at least one group being different from the lead of helices on the teeth of at least one other group, each tooth flank of said tool having a plurality of corresponding cutting edges and the lead of each helix being a whole multiple of the axial distance between such corresponding cutting edges.

9. A shaving tool as set forth in claim 8, wherein the axial distance between the ends of each helix in each of said groups is the same.

10. A shaving tool as set forth in claim 9, wherein the axial distance between the ends of each helix equals the axial distance between a pair of corresponding cutting edges on any given tooth flank of said tool.

11. As a novel article of manufacture, a rotary gear-shaped tool for treatment of toothed workpieces by the crossed-axes method, said tool comprising a plurality of teeth forming at least two groups each having a different number of teeth and one of said numbers being a prime number, said teeth having flanks provided with cutting edges extending from the roots to the lands thereof and the cutting edges on the teeth of each group forming a plurality of helices, the lead of helices formed by the cutting edges on teeth in one of said groups being different from the lead of helices formed by the cutting edges on the teeth of the other group.

12. A rotary gear-shaped tool for treatment of gear-shaped workpieces by the crossed-axes method, comprising equidistant teeth forming at least two groups and having flanks provided with straight cutting edges which extend in directions from the roots to the lands thereof in planes perpendicular to the axis of said tool, the cutting edges on the teeth of each group forming a plurality of helices and the lead of helices formed by the cutting edges on teeth in one of said groups being different from the lead of helices formed by the cutting edges on the teeth of the other group.

No references cited.

WILLIAM W. DYER, Jr., *Primary Examiner.*